United States Patent [19]

Sakai et al.

[11] Patent Number: 4,870,146

[45] Date of Patent: Sep. 26, 1989

[54] PROCESS FOR PRODUCING A LIGHT COLOR HIGH SOFTENING POINT HYDROCARBON RESIN

[75] Inventors: Yasushi Sakai, Yokkaichi; Tetsuo Fujii, Tokuyama; Michio Saito, Yokkaichi; Motoaki Munekata, Yokkaichi; Akio Kiyohara, Yokkaichi, all of Japan

[73] Assignee: Tosoh Corporation, Shin-nanyo, Japan

[21] Appl. No.: 214,000

[22] Filed: Jun. 30, 1988

[30] Foreign Application Priority Data

Jul. 8, 1987 [JP] Japan ................................ 62-168797

[51] Int. Cl.$^4$ ............................................. C08F 36/04
[52] U.S. Cl. ...................................... 526/237; 208/71; 526/290; 585/330
[58] Field of Search .................... 208/67, 71; 585/329, 585/330; 526/290, 237

[56] References Cited

U.S. PATENT DOCUMENTS

| | | | |
|---|---|---|---|
| 3,778,421 | 12/1973 | Hayashi et al. | 526/290 |
| 3,817,953 | 6/1974 | Younger | 526/290 |
| 3,860,543 | 1/1975 | Masuda et al. | 526/290 |
| 4,105,843 | 8/1978 | Iwase et al. | 526/77 |
| 4,113,931 | 9/1978 | Spengler et al. | 526/209 |
| 4,118,555 | 10/1978 | Vargiu et al. | 526/76 |
| 4,230,840 | 10/1980 | Katayama et al. | 526/290 |
| 4,539,388 | 9/1985 | Lüecke et al. | 528/271 |
| 4,558,107 | 12/1985 | Evans et al. | 526/237 |
| 4,562,233 | 12/1985 | Small et al. | 526/290 |
| 4,636,555 | 1/1987 | Luvinh et al. | 526/290 |
| 4,677,176 | 6/1987 | Evans et al. | 526/290 |

*Primary Examiner*—Anthony McFarlane
*Attorney, Agent, or Firm*—Oblon, Spivak, McClelland, Maier & Neustadt

[57] ABSTRACT

A process for producing a light color high softening point hydrocarbon resin, which comprises polymerizing an oil fraction obtained by condensing a fractionated component withdrawn in a gas phase from a recovery section of a fractionating tower located below the feeding section and above the bottom of the tower during the fractional distillation in the tower of a feed oil fraction having a boiling point within a range of from 140° to 280° C. selected among cracked oil fractions obtained by thermal cracking of petroleum.

5 Claims, 1 Drawing Sheet

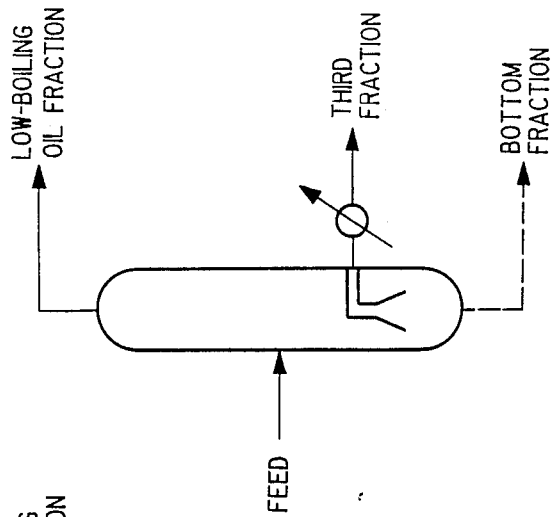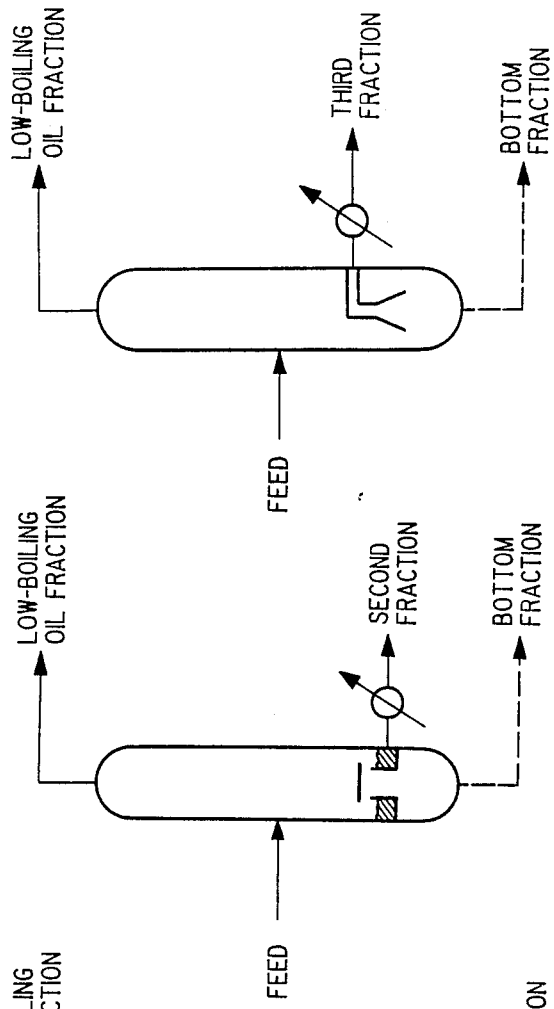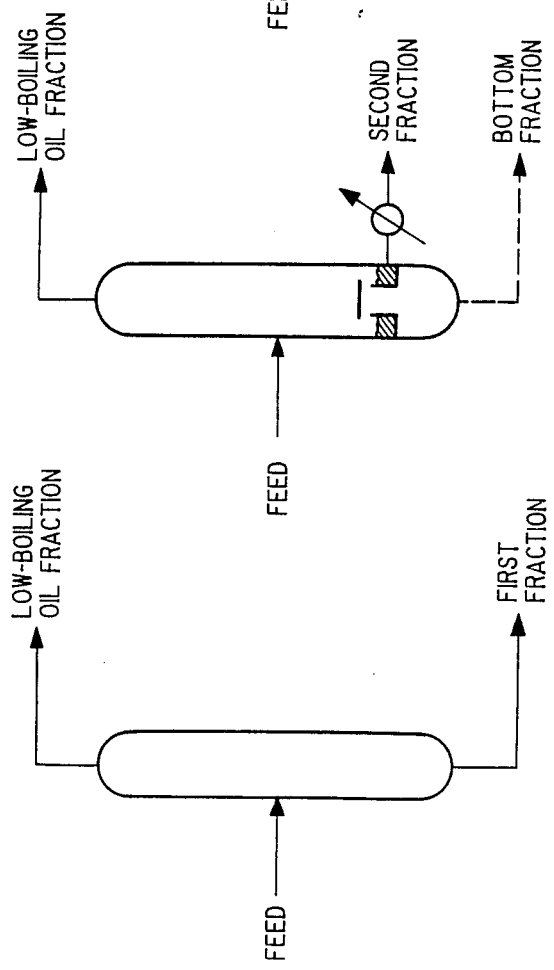

PROCESS FOR PRODUCING A LIGHT COLOR HIGH SOFTENING POINT HYDROCARBON RESIN

BACKGROUND OF THE INVENTION

1. Field of the Invention

The present invention relates to a process for producing a light color high softening point hydrocarbon resin readily and advantageously on an industrial scale from a high boiling fraction obtained by the distillation of a cracked oil fraction which is obtained by thermal cracking of petroleum in the presence of a catalyst.

2. Discussion of Background

Heretofore, a process for producing a high softening point aromatic hydrocarbon resin by using a high boiling oil fraction obtained by the distillation of an oil fraction having a boiling point within a range of from 140° to 280° C. among cracked oil fractions obtained by thermal cracking of petroleum has been known and has already been employed on an industrial scale.

However, according to such a conventional process, it is usual that among cracked oil fractions obtained by thermal cracking of petroleum, an oil fraction having a boiling point within a range of from 140° to 280° C. is fed to a distillation tower, and a high boiling oil fraction withdrawn from the bottom of the tower is employed. Accordingly, the resin obtained by the polymerization of such a high boiling oil fraction as the starting material had various problems such that the color was poor, and the polymer yield was low. As a method for improving the color of this high softening point hydrocarbon resin, it is known to subject the above-mentioned high boiling oil fraction withdrawn from the bottom to further distillation and to use a fraction obtained from the tower top. It is also known to use a high boiling oil fraction obtained by side cutting, for example, by a chimney tray located below the feeding section of the distillation tower and above the bottom of the tower.

However, as a result of the study by the present inventors, it has been found that the above-mentioned side cutting method has drawbacks such that the distillation temperature is high, and when the residence time in the distillation tower is prolonged, the polymer yield tends to be low when the oil thereby obtained is used as a starting material for the production of a resin. Further, the above-mentioned method for repeating distillation is not necessarily economical although it has no particular problems with respect to the physical properties of the resin thereby obtained or with respect to the polymer yield.

SUMMARY OF THE INVENTION

The present invention has been made with the above-mentioned conventional technical problems as its background, and it is an object of the present invention to obtain a light color high softening point hydrocarbon resin economically on an industrial scale.

The present inventors have conducted extensive studies to overcome the drawbacks inherent to the conventional methods and as a result, have found it possible to obtain a light color high softening point hydrocarbon resin by using as a polymerization starting material an oil fraction withdrawn from a recovery section of a distillation tower located below the feeding section and above the bottom of the tower, particularly a high boiling oil fraction obtained by withdrawing only an ascending vapor phase during the distillation out of the tower and condensing it. The present invention has been accomplished on the basis of this discovery.

Thus, the present invention provides a process for producing a light color high softening point hydrocarbon resin, which comprises polymerizing an oil fraction obtained by condensing a fractionated component withdrawn in a gas phase from a recovery section of a fractionating tower located below the feeding section and above the bottom of the tower during the fractional distillation in the tower of a feed oil fraction having a boiling point within a range of from 140° to 280° C. selected among cracked oil fractions obtained by thermal cracking of petroleum.

BRIEF DESCRIPTION OF THE DRAWINGS

FIGS. 1 and 2 show the embodiments of Comparative Examples 1 and 2, respectively.

FIG. 3 shows the embodiment of the Examples of the present invention.

DETAILED DESCRIPTION OF THE PREFERRED EMBODIMENTS

In the present invention, the high boiling oil fraction to be used as the starting material for polymerization is obtained by a method wherein, as mentioned above, a fractionated component is withdrawn in a gas phase from the recovery section located below the feeding section of the feed oil fraction to be fractionated and above the bottom of the tower and then condensed. As mentioned above, it is possible to obtain a high softening point resin by a method for polymerizing an oil component obtained by side cutting of a descending liquid phase by means of a conventional method like a chimney tray method commonly employed for the distillation of petroleum. However, in such a method, the color of the resin thereby obtained is poor, and the polymer yield tends to be low, as mentioned above. In the present invention, it is essential to withdraw an ascending vapor phase during the distillation and then condense it.

In the present invention, the position (plate) at which the ascending vapor phase is withdrawn from the fractional distillation tower during the distillation is preferably as close as possible to the bottom of the tower (i.e. at a plate as lower as possible) with a view to efficient fractionation of the cracked oil fraction into a low boiling oil fraction and a high boiling oil fraction. However, in order to avoid inclusion of a deteriorated distillate into the fractionated component due to e.g. entrainment, it is preferably at a position of from 1 to 2 plates above the bottom of the tower.

The proportion of the high boiling oil fraction to be withdrawn varies depending upon the content of the fraction in the feed oil, such as the content of indene or an indene derivative such as an alkyl indene. However, it is usual to withdraw such a high boiling oil fraction in an amount of from 30 to 60% by weight based on the amount of the feed oil fraction.

The fractional distillation to obtain such a high boiling oil fraction may be conducted by atmospheric distillation or vacuum distillation.

The polymerization catalyst which may be used in the present invention, may be a conventional catalyst used for the polymerization of hydrocarbons. For example, as a Friedel-Crafts catalyst, an aluminum halide such as anhydrous aluminum trichloride or its complex, boron trifluoride or its complex, or a tin halide such as tin tetrachloride may be mentioned. Particularly preferred is anhydrous aluminum trichloride, boron trifluoride or a complex thereof.

The conditions such as the polymerization temperature, the polymerization time and the amount of the catalyst used for the polymerization in the present invention may be those commonly employed for the polymerization of hydrocarbon resins, i.e. at a temperature of from 10° to 100° C. for from 0.5 to 6 hours and in an amount of from 0.1 to 1% by weight based on the feed material. However, the polymerization conditions are not limited to such ranges.

After completion of the polymerization reaction, the oil phase containing the polymerization reaction mixture is contacted with water or an aqueous alkaline solution in the presence or absence of a surfactant, and then the aqueous phase is separated, followed by termination of the polymerization, removal of the catalyst and deashing.

When a surfactant is used in the above treatment, it may be used in an amount of from 0.1 to 200 ppm relative to the aqueous phase. However, the amount is not limited to this range. When water or an aqueous alkaline solution is used as mentioned above, there is no particular restriction as to the amount of use, but it is usual to use it in an amount of from 20 to 200 parts by weight relative to 100 parts by weight of the oil phase.

There is no particular restriction as to the temperature for the removal of the catalyst or deashing. However, it is usually preferred to conduct such operation under a slightly heated condition i.e. at a temperature within a range of from 50° to 100° C. By conducting the removal of the catalyst and deashing in such a manner, it is possible to obtain a resin having a sufficiently low ash content. However, if necessary, the oil phase obtained in the above-mentioned manner may further be washed with water in the presence or absence of a surfactant.

From the oil phase after the removal of the catalyst and deashing, unreacted oil is distilled off by a usual method such as distillation to obtain a light color high softening point hydrocarbon resin.

Now, the present invention will be described in further detail with reference to Examples. However, it should be understood that the present invention is by no means restricted by such specific Examples.

COMPARATIVE EXAMPLE 1

Among cracked oil fractions obtained by thermal cracking of petroleum, an oil fraction having a boiling point within a range of from 140° to 280° C. (hereinafter referred to as an aromatic fraction) was subjected to fractional distillation by an apparatus as shown in FIG. 1, whereby a high-boiling oil fraction (first fraction) was obtained from the bottom. The operational conditions of the distillation tower shown in FIG. 1 were as shown in Table 1.

COMPARATIVE EXAMPLE 2

A high boiling oil fraction (second fraction) was obtained by an apparatus capable of side cutting descending liquid drops of the aromatic fraction as shown in FIG. 2 (such as a chimney tray). The plate for side cutting was the second plate from the bottom. The operational conditions of the distillation tower shown in FIG. 2 were the same as in Comparative Example 1.

EXAMPLE 1

A high boiling oil fraction (third fraction) was obtained by an apparatus capable of side cutting an ascending vapor of the aromatic fraction as shown in FIG. 3. The plate for side cutting was the second plate from the bottom. The operational conditions of the distillation tower shown in FIG. 3 were the same as in Comparative Example 1.

COMPARATIVE EXAMPLE 3

Into a four-necked separable flask having an internal capacity of 2 liters, 500 g of the first fraction was charged. The interior of the flask was thoroughly substituted by nitrogen. Then, 2.5 g of a boron trifluoride-phenol complex was dropwise added thereto over a period of 30 minutes under stirring at a reaction temperature of 40° C.

After completion of the dropwise addition, the mixture was reacted for further one hour at 40° C.

After completion of the reaction, 250 g of a 1 wt % sodium hydroxide aqueous solution and 250 g of xylene were added thereto, and the mixture was stirred at 60° C. for 30 minutes for neutralization and then left to stand still at 60° C. for 30 minutes. The oil phase and the aqueous phase were separated. From the separated oil phase, unreacted oil was distilled off by steam distillation to obtain a resin having a softening point of 123° C. and a color of 15. The physical properties of the resin thus obtained are shown in Table 2.

COMPARATIVE EXAMPLE 4

The operation was conducted in the same manner as in Comparative Example 3 except that the second fraction was used instead of the first fraction, whereby a resin having a softening point of 145° C. and a color of 16 was obtained. The physical properties of the resin thus obtained are shown in Table 2.

EXAMPLE 2

The operation was conducted in the same manner as in Comparative Example 3 except that the third fraction was used instead of the first fraction, whereby a resin having a softening point of 155° C. and a color of 8 was obtained. The physical properties of the resin thus obtained are shown in Table 2.

TABLE 1

| | |
|---|---|
| Number of plate | 16 |
| Feed plate (from bottom) | 8 |
| Feed temperature (°C.) | 105 |
| Bottom temperature (°C.) | 135 |
| Bottom pressure (mmHg,abs) | 180 |
| Overhead temperature (°C.) | 110 |
| Overhead pressure (mmHg,abs) | 140 |
| Reflux ratio | 5.0 |

TABLE 2

| | Polymer yield (%) | Softening point (R & B) (°C.) | Color (Gardner) | Bromine value (JIS K-2543) | Molecular weight (GPC) |
|---|---|---|---|---|---|
| Comparative Example 3 | 23 | 123 | 15 | 35 | 1800 |
| Comparative Example 4 | 30 | 145 | 16 | 25 | 2000 |
| Example 2 | 60 | 155 | 8 | 20 | 2800 |

The process of the present invention wherein a high boiling oil fraction obtained by withdrawing a fractionated component during the distillation of a certain specific feed oil is economical without necessity to subject the high boiling oil fraction to redistillation as mentioned above, and capable of producing a light color high softening point hydrocarbon resin having an excellent color since it does not contain deteriorated oil.

What is claimed is:

1. A process for producing a hydrocarbon resin of improved color and softening point, which comprises polymerizing an oil fraction obtained by condensing a fractioned component which is withdrawn as an ascending gas phase from a recovery section of a fractioning tower located below the feeding section and above the bottom of the tower during the fractional distillation in the tower of a feed oil fraction having a boiling point within the range of from 140° to 280° C. selected from cracked oil fractions obtained by thermal cracking of petroleum.

2. The process according to claim 1, wherein the recovery section is located at a position of from 1 to 2 plates above the bottom of the tower.

3. The process according to claim 1, wherein said fractionated component is withdrawn in an amount of from 30 to 60% by weight based on the amount of the feed oil fraction.

4. The process according to claim 1, wherein the polymerization is conducted in the presence of a Friedel-Crafts catalyst.

5. The process according to claim 1, wherein the polymerization is conducted in the presence of anhydrous aluminum trichloride, boron trifluoride or a complex thereof as catalyst.

* * * * *